United States Patent
Stegner et al.

(10) Patent No.: US 9,731,367 B2
(45) Date of Patent: Aug. 15, 2017

(54) GEAR OR PROFILE GRINDING MACHINE AND METHOD FOR THE OPERATION OF SUCH A MACHINE

(71) Applicants: KAPP Werkzeugmaschinen GmbH, Coburg (DE); NILES Werkzeugmaschinen GmbH, Berlin (DE)

(72) Inventors: Achim Stegner, Coburg (DE); Sven Thierfelder, Mitwitz (DE); Andreas Wellein, Bad Staffelstein (DE)

(73) Assignees: KAPP WERKZEUGMASCHINEN GMBH, Coburg (DE); NILES WERKZEUGMASCHINEN GMBH, Berlin (DE)

( * ) Notice: Subject to any disclaimer, the term of this patent is extended or adjusted under 35 U.S.C. 154(b) by 70 days.

(21) Appl. No.: 15/008,759

(22) Filed: Jan. 28, 2016

(65) Prior Publication Data
US 2016/0214195 A1 Jul. 28, 2016

(30) Foreign Application Priority Data
Jan. 28, 2015 (DE) .................. 10 2015 001 036

(51) Int. Cl.
*B23F 21/00* (2006.01)
*B23F 23/12* (2006.01)
(Continued)

(52) U.S. Cl.
CPC ............... *B23F 21/00* (2013.01); *B23F 1/02* (2013.01); *B23F 23/12* (2013.01); *B23Q 11/001* (2013.01)

(58) Field of Classification Search
CPC . B23F 21/00; B23F 1/02; B23F 23/12; B23Q 11/001
(Continued)

(56) References Cited

U.S. PATENT DOCUMENTS 2,208,804 A 7/1940 Pfauter
2,696,763 A 12/1954 Daugherty et al.
(Continued)

FOREIGN PATENT DOCUMENTS

DE 19920323 A1 10/2000
DE 2010 028032 10/2011
(Continued)

OTHER PUBLICATIONS

European Search Report for EP Application No. 16 00 0050, dated Jun. 22, 2016; 7 pages.

*Primary Examiner* — George Nguyen
(74) *Attorney, Agent, or Firm* — Lucas & Mercanti, LLP

(57) ABSTRACT

A gear or profile grinding machine and a method for operating such a machine, especially for grinding of pre-geared or pre-profiled workpieces, wherein the machine includes at least one tool spindle which can receive at least one grinding tool, and at least one workpiece spindle which is movably arranged at a carrier element and which can be driven up to the tool spindle for an at least temporary cooperation of the workpiece with the grinding tool by at least one drive. To enhance the precision of the machine at growing workpieces with simple measures, at least one mass is arranged at or in the carrier element, which is arranged movable at or on a guiding element by a drive element, wherein the mass is permanently free from any contact with another machine part and/or workpiece part and/or tool part.

10 Claims, 2 Drawing Sheets

(51) Int. Cl.
*B23F 1/02* (2006.01)
*B23Q 11/00* (2006.01)

(58) Field of Classification Search
USPC .......................................................... 451/47
See application file for complete search history.

(56) References Cited

U.S. PATENT DOCUMENTS

| | | | | |
|---|---|---|---|---|
| 4,084,350 | A * | 4/1978 | Ongaro | B24B 5/366 451/254 |
| 4,461,121 | A * | 7/1984 | Motzer | B24B 3/065 451/226 |
| 4,546,575 | A * | 10/1985 | Adams | B24B 3/025 451/220 |
| 4,991,353 | A * | 2/1991 | Wiener | B23F 9/025 451/11 |
| 5,303,510 | A * | 4/1994 | Calkins | B23Q 5/027 451/165 |
| 8,506,358 | B2 * | 8/2013 | Amarell | B23F 23/04 409/9 |
| 2003/0124961 | A1 * | 7/2003 | Haney | B24B 7/02 451/66 |
| 2011/0081833 | A1 | 4/2011 | Amarell et al. | |
| 2011/0183586 | A1 * | 7/2011 | Lehman | B24B 23/026 451/357 |
| 2013/0072096 | A1 * | 3/2013 | Hoerner | B23F 23/1218 451/259 |
| 2014/0308877 | A1 * | 10/2014 | Weppelmann | B23F 17/00 451/5 |

FOREIGN PATENT DOCUMENTS

| | | |
|---|---|---|
| EP | 2305409 | 6/2012 |
| EP | 2305409 B1 | 6/2012 |

* cited by examiner

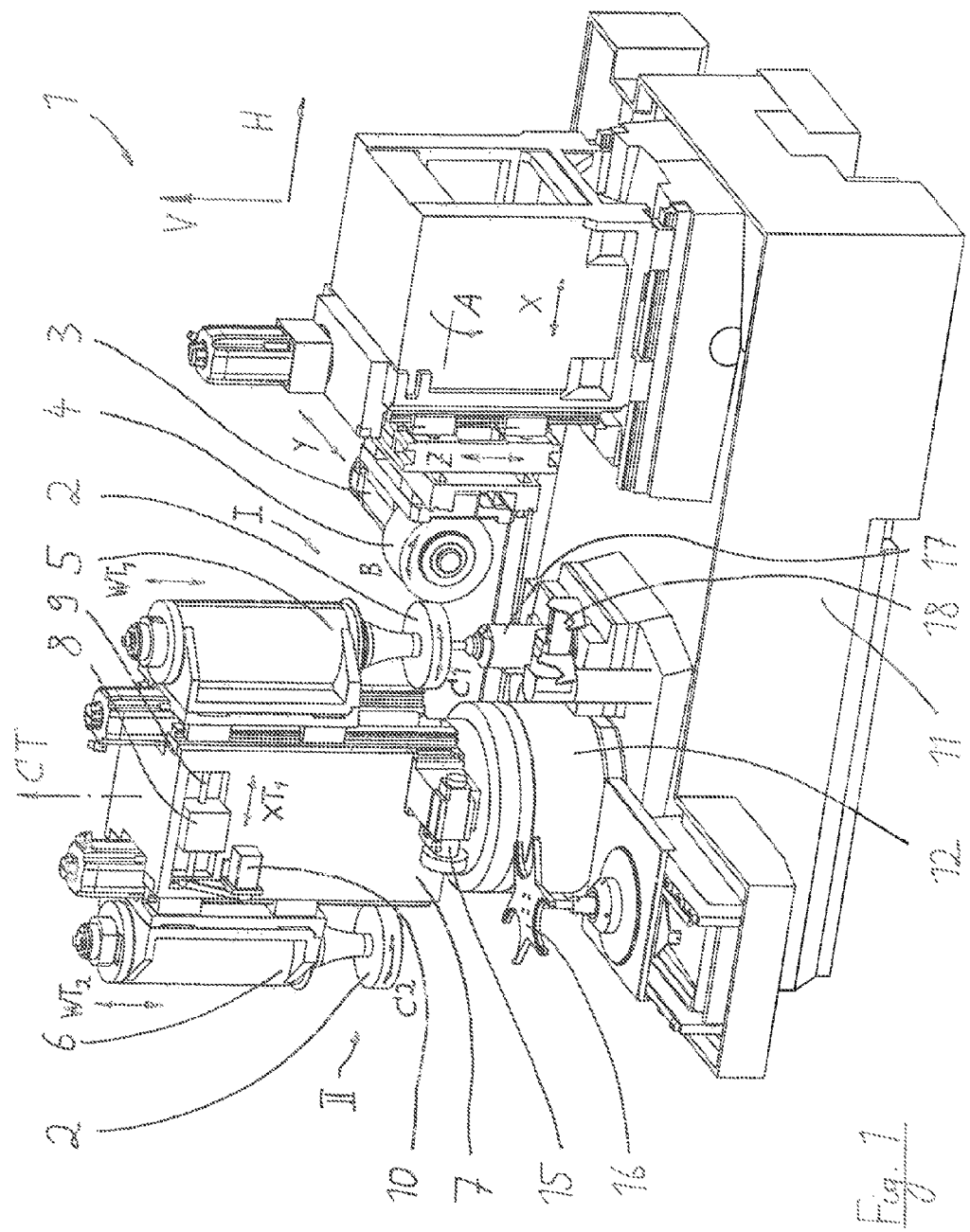

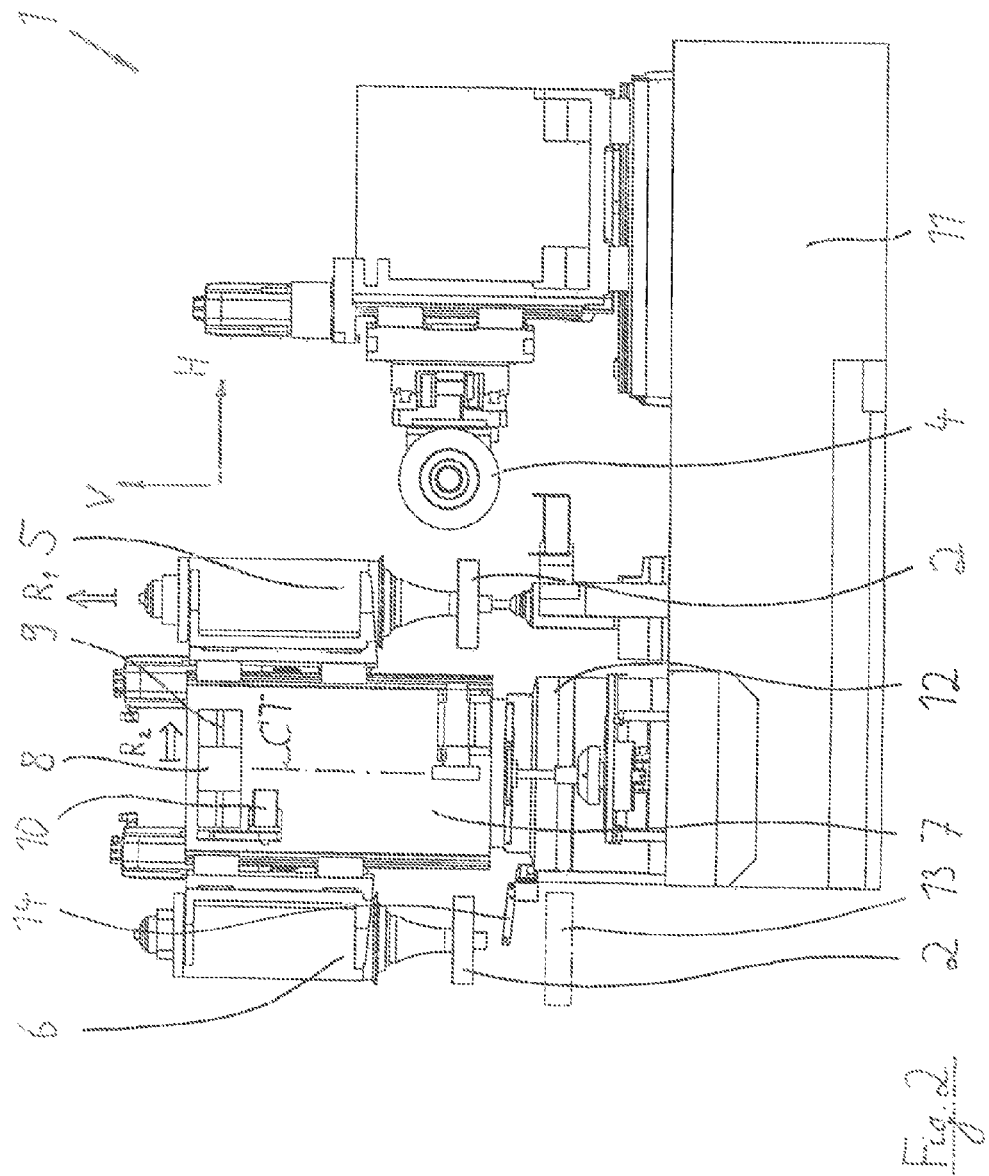

GEAR OR PROFILE GRINDING MACHINE AND METHOD FOR THE OPERATION OF SUCH A MACHINE

CROSS-REFERENCE TO RELATED APPLICATIONS

The present application claims priority of DE 10 2015 001 036.0, filed Jan. 28, 2015, the priority of this application is hereby claimed and this application is incorporated herein by reference.

BACKGROUND OF THE INVENTION

The invention relates to a gear or profile grinding machine, especially for grinding of pre-geared or pre-profiled workpieces, wherein the machine comprises at least on tool spindle which can receive at least one grinding tool and wherein the machine comprises at least on workpiece spindle which is movable arranged at a carrier element and which can be driven up to the tool spindle for an at least temporary cooperation of the workpiece with the grinding tool by means of at least one drive. Furthermore, the invention relates to a method for operating such a gear or profile grinding machine.

Especially at the production of gears the final grinding process has a high importance. At this process the tooth flanks are subject to a grinding operation by which they are brought to the exact contour. An efficient method for the production of the gearing is the generative grinding by a grinding worm or the profile grinding with a profile grinding disc.

At workpieces especially with small gearings (tip diameter up to about 200 mm) the process main time is relatively short compared to the secondary times. Due to the relatively short main time machines and grinding methods are required for obtaining an economic production process which have an improved ratio between main time and secondary time. This applies specifically when additionally also the workpiece lot size decreases—as a consequence of a rising plurality of variants of the workpieces. Thereby, the reduction of the setup time becomes more and more important.

A gear grinding machine of the kind mentioned above as well as a method for the operation of the same are known from EP 2 305 409 B1. Here, already a solution is described which is characterized in that a favourable ratio between machining main time and secondary times can be obtained. Accordingly, an economical beneficial production is possible. Also the setup part can be kept small in relation to the machining main times. A similar solution shows DE 199 20 323 A1 which uses two workpiece spindles which are operated alternately.

However, it is detrimental at such a gear grinding machine with "pick up concept" that at rising diameters of the gears to be machined (especially at diameters from 125 mm upwards) the mass forces become so big at the handling of the workpieces that the required precision of the positioning suffers and the required level of quality cannot be ensured without elaborate measures. Accordingly, at machines with the design of EP 2 305 409 B2 the size of the workpieces is mostly limited for a process reliable gear grinding to a maximum diameter of 125 mm. It is difficult to machine exceeding workpiece dimensions in a process reliable manner due to the conceptual sensitivity to vibrations.

Thereby, it was found out that for some diseases no satisfying result is obtained. Here, especially the treatment of migraine is concerned which is sometimes not efficiently treatable when using conventional stimulation devices.

SUMMARY OF THE INVENTION

Thus, it is an object of the invention to further develop a machine of the kind mentioned above and a respective method for its operation in such a manner so that it is possible to overcome the conceptual restrictions of the machine design in terms of critical vibrations. Thereby, it is aimed for to at least double the diameter of the workpieces which was possible up to now and to quadruplicate the mass of the workpieces at process reliable machining.

The solution of this object by the invention in terms of the method is characterized in that at or in the carrier element at least one mass is arranged, which is arranged movable at or on a guiding element by means of a drive element, wherein the mass is permanently free from any contact with another machine part and/or workpiece part and/or tool part.

Thereby, preferably the mass is linear movable at or on the guiding element. The guiding element is preferably designed as linear guide. The drive element is preferably designed as servomotor. The mentioned mass acts thus as part, wherein according to the invention exclusively its mass forces are used; a connection of the mass with another part of the machine does not exist—apart from said guiding element.

According to a preferred embodiment of the invention two workpiece spindles are arranged at one carrier element. The carrier element can thereby be designed as a tower which extends in vertical direction. The carrier element is thereby preferably arranged rotatable around the vertical. The at least one mass can thereby be movable arranged at or on the guiding element in horizontal direction.

The method for the operation of a gear or profile grinding machine is characterized according to the invention in that simultaneously with the displacement of the workpiece spindle at or on the carrier element at least one mass is displaced at or on a guiding element by means of a drive element, wherein the mass is permanently free from any contact with another machine part and/or workpiece part and/or tool part.

Preferably thereby a displacement of the workpiece spindle takes place in vertical direction and a displacement of the mass takes place in horizontal direction.

Insofar, the invention applies to a gear grinding machine with "pick up concept" for workpieces with a diameter up to 250 mm, at which preferably two workpiece spindles are arranged vertically movable in a 180° angle to another at a swivel tower. The mass forces which occur due to the high dynamic of the "pick up spindles" (i.e. at the movement of the workpiece spindles in vertical direction) are thus compensated by means of a separate mass ("seismic mass") which is integrated in the swivel tower.

Thereby a negative effect to the grinding result stays away. A respective controlling and dimensioning of the mass makes sure that no restriction of the vertical axis with respect to its dynamics must be taken into consideration.

The proposed design according to the invention allows that workpiece diameters up to 250 mm and more can be machined without problems by the preferred "pick up machine concept", i.e. starting from the workpiece diameter of 125 mm which was relevant up to now a doubling of the diameter can be realized. So, an additional production capacity can be gained in an energy efficient manner. In total the economy of the gear grinding process is correspondingly improved.

Preferably two "pick up" workpiece spindles are arranged at a single column, wherein the workpiece spindles are mounted oppositely. At a third position a dresser for dressing of the grinding tool can be provided. While then parts are machined at one workpiece spindle, at the second spindle the already finish machined workpiece is deposited for example on a conveyor band. Afterwards a new part is taken from the band by the pick up spindle, clamped and aligned. When the part at the first workpiece spindle is finish machined the column rotates by 180° around the vertical axis and brings thereby the next workpiece in the machining area for machining.

In general, the mass ("seismic mass") which is integrated in the swivel tower carries out a compensation movement (counter movement) during the movement of the pick-up spindle at the loading and unloading side to compensate the occurring mass forces.

The concept provides preferably an integrated storage with up to three magazines for discharging of NIO/SPC parts. Furthermore, this storage is provided for the automatic change of tensioning means.

Beneficially, the proposed machine is especially applicable for applications in the automotive and machine building industry. As examples are mentioned passenger car gear boxes (manual gear boxes, stepped automatic transmissions, duplex clutch gear boxes), part of planetary gears (preferably with a diameter of 30 to 60 mm) and control gears (preferably 50 to 160 mm) as well as axle drive gears (preferably 170 to 250 mm). Likewise, truck gear boxes as well industrial gear boxes should be mentioned.

The embodiments of the grinding machine as described in EP 2 305 409 B1 of the patent applicant are thereby especially preferred; explicit reference is made to this document.

In the region of the tool spindle a counter holder can be arranged stationary on or at a machine bed. This counter holder can be used by both workpiece spindles. Also, further periphery devices can be provided: At one location an aligning device for the workpiece can be arranged stationary on or at the machine bed.

Furthermore, at the carrier element (tower) a dressing device for the grinding tool can be arranged; with this the grinding tool can be dressed when required.

Furthermore, at another location a centrifuge station for the workpiece can be arranged stationary on or at the machine bed.

At a further location a changing station for tensioning means can be arranged stationary on or at the machine bed. Furthermore, a station for depositing for a workpiece can be arranged on or at the machine bed. Thereby, a preferred embodiment provides that the changing station for tensioning means and the station for depositing of a workpiece respectively comprises a rotary table with at least two depositing places. Thereby, the changing station for tensioning means and the station for depositing of a workpiece are preferably designed as combined unit.

Finally, in the region of the tool spindle a changing station for grinding tools can be arranged stationary on or at the machine bed.

Beneficial, with the proposed concept the secondary times can be optimized (minimized) and setup processes and functions for automating can be integrated. The loading and unloading of workpiece spindles with workpieces, the clamping, the aligning (centering) of the gear, the acceleration and deceleration as well as the centrifugation of the workpieces can be realized parallel to the grinding on the other workpiece spindle. Accordingly, the proposed concept allows also a substantial improvement with respect to the secondary times.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

In the drawing:

FIG. 1 shows in a perspective view a gear grinding machine with a carrier element in the form of a vertical extending tower at which two workpiece spindles are arranged to move workpieces from a loading and unloading area to a grinding position and back, FIG. 2 shows the corresponding front view according to FIG. 1.

DETAILED DESCRIPTION OF THE INVENTION

In the figures a gear grinding machine 1 is shown which comprises a machine base 11. On the machine base 11 at first the usual elements are arranged to be able to carry out a gear grinding operation. Accordingly, the machine 1 has especially a tool spindle 3 with a grinding tool 4 (grinding disc or grinding worm, as the case may be also several grinding tools offset in axial direction, e.g. for roughing and finishing) which is arranged at a tool carrier, which tool spindle 3 is arranged on a respective movable guide so that it can carry out the required movements for the grinding process. In the figures the intended directions of movement are shown by double arrows, namely X, Y, Z, A, B. But those are not discussed here any further as those axes are usually provided.

Furthermore, at the gear grinding machine 1 two workpiece spindles 5 and 6 are provided which are respectively designed for the reception of a workpiece 2 (see axes of rotation C1 and C2 in FIG. 1). Those two workpiece spindles 5, 6 are arranged at a carrier element 7 in the form of a tower in such a manner that they can be swivelled around a vertical axis, namely around the swivel axis CT. During swivelling around the axis CT a workpiece 2 which is clamped on one of the workpiece spindles 5, 6 can be moved from a grinding position I to a loading position II respectively reverse from the position II to the position I.

In the loading position II a workpiece 2 can be loaded or unloaded by means of a not depicted tool supply. Thereby, the workpieces 2 can for example by means of a conveyor band be transported to or away from the machine. Of course, also any other kind of provision or transport of workpieces 2 away from the machine is possible, e.g. a loading cell.

For the positioning of the workpiece 2 in vertical direction, i.e. in the direction of the vertical V, the workpiece spindle 5, 6 is moving in the direction $WT_1$ and $WT_2$ respectively. If the workpiece 2 has a respective high mass it results that significant mass forces arise at a quick movement in the direction $WT_1$ and $WT_2$ respectively. To prevent this and to counteract to this respectively it is provided that at or in the carrier element 7 a mass 8 is arranged which is movably arranged on a guiding element 9 by means of a drive element 10. The direction of movement of the mass 8 is denoted in FIG. 1 with $XT_1$. The guiding element 9 is designed as screw jack in the present case. In the mass 8 a corresponding (not depicted) nut is arranged which cooperates with the screw jack. Accordingly the mass 8 moves at the rotation of the screw jack translational, wherein said rotation is effected by the drive element 10 in the form of a servomotor.

Thereby, the mass 8 is permanently free from any contact with another machine part and/or workpiece part and/or tool part. Rather, the mass 8 acts as a body (i.e. as seismic mass) which acts onto the system only by its mass forces (transferred via the guiding element 9 on the tower 7) and—at a respective controlling of the drive element 10—acts balancing to the mass force which is created by the workpiece spindle 5, 6.

Thus, if the workpiece spindle 5 is displaced in direction $R_1$—see FIG. 2—the mass 8 can be moved specifically and simultaneously in direction $R_2$ so that a compensating torque results due to the mass force of the mass 8 related to the base point at which the tower 7 stands on the machine base 11 and in total grants a more stable stand for the tower. As can be seen in FIG. 2 thus in this specific case said balance is created by the mass forces of the mass 8 so that to the movement of the workpiece spindle 5 in vertical direction V a contrariwise movement of the mass 8 in horizontal direction H is set.

The tower 7 is presently arranged on a rotary table 12. Beside the machine the loading and unloading area 13 is arranged. Furthermore an alignment unit 14, a dressing unit 15, a changing station for tensioning means 16 (SPC (parts to be measured)/NIO (defective parts)—deposit), a tailstock 17 and a changing station for grinding tools 18 should be mentioned.

For the alignment unit 14 the following should be noted: The unit comprises in the embodiment a setup-free alignment sensor which comprises preferably (at least) one NC axis by which it can be carry out (at least) one linear movement.

While specific embodiments of the invention have been shown and described in detail to illustrate the inventive principles, it will be understood that the invention may be embodied otherwise without departing from such principles.

We claim:

1. Gear or profile grinding machine, especially for grinding of pre-geared or pre-profiled workpieces, wherein the machine comprises at least one tool spindle which can receive at least one grinding tool and wherein the machine comprises at least one workpiece spindle which is movable arranged at a carrier element and which can be driven up to the tool spindle for an at least temporary cooperation of the workpiece with the grinding tool by means of at least one drive, wherein at or in the carrier element at least one mass is arranged, which is arranged movable at or on a guiding element by means of a drive element, wherein the mass is permanently free from any contact with another machine part and/or workpiece part and/or tool part.

2. The gear or profile grinding machine according to claim 1, wherein the mass is linear movable at or on the guiding element.

3. The gear or profile grinding machine according to claim 1, wherein the guiding element is designed as linear guide.

4. The gear or profile grinding machine according to claim 1, wherein the drive element is designed as servomotor.

5. The gear or profile grinding machine according to claim 1, wherein two workpiece spindles are arranged at one carrier element.

6. The gear or profile grinding machine according to claim 5, wherein the carrier element is designed as a tower which extends in vertical direction.

7. The gear or profile grinding machine according to claim 6, wherein the carrier element is arranged rotatable around the vertical.

8. The gear or profile grinding machine according to claim 5, wherein the at least one mass is movable arranged at or on the guiding element in horizontal direction.

9. A method for operating a gear or profile grinding machine according to claim 1, at which at least one workpiece spindle is moved in a displacement direction at or on a carrier element, wherein simultaneously with the displacement of the workpiece spindle at or on the carrier element at least one mass is displaced at or on a guiding element by means of a drive element, wherein the mass is permanently free from any contact with another machine part and/or workpiece part and/or tool part.

10. The method according to claim 9, wherein the displacement of the workpiece spindle takes place in vertical direction and the displacement of the mass takes place in horizontal direction.

* * * * *